US012747086B2

(12) United States Patent
Rucci

(10) Patent No.: US 12,747,086 B2
(45) Date of Patent: Sep. 29, 2026

(54) ECO-GARDEN PACKAGING DEVICE

(71) Applicant: Kathryn Rucci, Orlando, FL (US)

(72) Inventor: Kathryn Rucci, Orlando, FL (US)

( * ) Notice: Subject to any disclaimer, the term of this patent is extended or adjusted under 35 U.S.C. 154(b) by 66 days.

(21) Appl. No.: 18/638,102

(22) Filed: Apr. 17, 2024

(65) Prior Publication Data

US 2025/0153926 A1 May 15, 2025

Related U.S. Application Data

(60) Provisional application No. 63/598,707, filed on Nov. 14, 2023.

(51) Int. Cl.

*B65D 81/36* (2006.01)
*A01G 13/32* (2025.01)
*B65D 30/00* (2006.01)
*B65D 65/46* (2006.01)

(52) U.S. Cl.

CPC ............. *B65D 81/36* (2013.01); *A01G 13/32* (2025.01); *B65D 29/00* (2013.01); *B65D 65/466* (2013.01)

(58) Field of Classification Search

CPC ...... B65D 81/36; B65D 29/00; B65D 65/466; A01G 13/32
USPC ..................................................... 383/4
See application file for complete search history.

(56) References Cited

U.S. PATENT DOCUMENTS 4,296,788 A 10/1981 Slater
7,249,792 B1 7/2007 Bunten
D630,860 S 1/2011 Sichel
D765,929 S 9/2016 Mataya
D804,829 S 12/2017 Austin
11,274,443 B1 3/2022 Witt
2011/0296755 A1* 12/2011 Hawkinson ............ A01G 13/32 383/105
2013/0336729 A1* 12/2013 Hawkinson ............ E02B 7/005 405/302.6
2014/0219731 A1* 8/2014 Hawkinson ............ E02D 31/00 405/302.6
2014/0377005 A1* 12/2014 Hawkinson ............ E02D 31/00 405/16
2015/0368872 A1* 12/2015 Hawkinson ............ B05B 12/24 383/102

(Continued)

FOREIGN PATENT DOCUMENTS

CA 2624386 A1 * 9/2009 ............ C09K 17/52

*Primary Examiner* — Derek J Battisti
(74) *Attorney, Agent, or Firm* — Brennan, Manna & Diamond, LLC

(57) ABSTRACT

A fabric lawn bag device is disclosed that can be used to hold rocks, mulch, wood chips, etc. The fabric lawn bag device comprises a body component that is configured in a rectangular shape that has a front surface and a rear surface secured together at a bottom end and the opposing side ends, forming an interior cavity for retaining landscaping materials. The body component is manufactured of a fabric material, such that the device is durable and will not tear easily even with heavy material inside. Once, users have emptied the bag device, the user cuts open the body component to lay flat and uses the body component as landscaping fabric to cover a flowerbed or other area. Accordingly, the fabric lawn bag device saves both money and reduces environmental waste by providing a device that functions as two individual products.

11 Claims, 3 Drawing Sheets

(56) References Cited

U.S. PATENT DOCUMENTS

| | | | | |
|---|---|---|---|---|
| 2016/0227756 | A1* | 8/2016 | Hawkinson | A01G 13/30 |
| 2024/0237591 | A1* | 7/2024 | Wortman | B32B 29/005 |

* cited by examiner

ECO-GARDEN PACKAGING DEVICE

CROSS-REFERENCE TO RELATED APPLICATION

The present application claims priority to, and the benefit of, U.S. Provisional Application No. 63/598,707, which was filed on Nov. 14, 2023, and is incorporated herein by reference in its entirety.

FIELD OF THE INVENTION

The present invention relates generally to the field of fabric lawn bag devices. More specifically, the present invention relates to a fabric landscaping bag designed to hold mulch, seeds, rocks, and other materials. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in fabric lawn bag devices. Generally, people may utilize landscaping fabric when maintaining a yard or garden area. This type of material must be purchased separately from containers that store landscaping materials like mulch, seed, etc. However, current gardening items are commonly sold in plastic or mesh bags that are thrown away and become trash in landfills.

Generally, many people utilize large amounts of landscaping material each year to beautify and maintain their yard and flowerbeds, as well as other landscaping areas. Typically, these people purchase landscaping materials, such as mulch, stones, seed, etc., in plastic bags that once they are emptied, are then disposed of. Furthermore, many people also utilize large amounts of landscaping fabric which prevents weed growth in flowerbeds and other areas. Consequently, it would be beneficial to have a product that would double as both a landscaping bag to hold landscaping materials and then can be utilized as landscaping fabric, instead of being merely disposed of in the trash after being emptied of its product.

Accordingly, there is a demand for an improved fabric lawn bag device that doubles as both a landscaping bag for retaining landscaping materials and as landscaping fabric to prevent the growth of weeds. More particularly, there is a demand for a fabric lawn bag device that saves both money and reduces the environmental impact by allowing the device to function as two products.

Therefore, there exists a long-felt need in the art for a fabric lawn bag device that provides users with a fabric landscaping bag designed to hold mulch, seeds, rocks, and other materials. There is also a long-felt need in the art for a fabric lawn bag device that doubles as landscaping fabric once the bag is empty to save money and prevent the bags from being thrown away. Further, there is a long-felt need in the art for a fabric lawn bag device that allows users to purchase items in the bags and carry them from home to the store without worry of rips and tears via a strong, durable material. Moreover, there is a long-felt need in the art for a device that saves time and effort when spreading out weed-block underneath mulch, rocks, wood chips, and the like. Further, there is a long-felt need in the art for a fabric lawn bag device that provides a durable bag that won't tear when transporting heavy materials. Finally, there is a long-felt need in the art for a fabric lawn bag device that helps save money and reduce environmental waste.

The subject matter disclosed and claimed herein, in one embodiment thereof, comprises a fabric lawn bag device. The device is a landscaping fabric bag that can be used to hold rocks, mulch, wood chips, etc. The fabric lawn bag device comprises a body component that is configured in a rectangular shape that has a front surface and a rear surface secured together at a bottom end and the opposing side ends, forming an interior cavity for retaining landscaping materials. The body component is manufactured of a fabric material, such that the device is durable and will not tear easily even with heavy material inside. Once, users have emptied the bag device, the user cuts open the body component to lay flat and uses the body component as landscaping fabric to cover a flowerbed or other area. Thus, users can use the body component as landscaping fabric via placing the landscape material on top of the body component, instead of buying landscaping fabric and throwing away plastic bags. Accordingly, the fabric lawn bag device saves both money and reduces environmental waste by providing a device that functions as two individual products.

In this manner, the fabric lawn bag device of the present invention accomplishes all of the foregoing objectives and provides users with a device that doubles as both a landscaping bag to hold landscaping materials and as landscaping fabric to line a flowerbed. The device is a durable bag of varying sizes. The device can be manufactured of a fabric material.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a fabric lawn bag device. The device is a landscaping fabric bag that can be used to hold landscaping materials. The fabric lawn bag device comprises a body component that is configured in a rectangular shape for retaining landscaping materials. The body component is manufactured of a fabric material, such that the device is durable and will not tear easily even with heavy material inside. Once, users have emptied the bag device, the user cuts open the body component to lay flat and uses the body component as landscaping fabric to cover a flowerbed or other area. Thus, users can use the body component as landscaping fabric via placing the landscape material on top of the body component, instead of buying landscaping fabric and throwing away plastic bags. Accordingly, the fabric lawn bag device saves both money and reduces environmental waste by providing a device that functions as two individual products.

In one embodiment, the fabric lawn bag device comprises a body component that is configured in a rectangular shape but could be any suitable shape as is known in the art. The body component is also available in different sizes and configurations depending on the needs and/or wants of a user. Further, the body component comprises a front surface and a rear surface secured together at a bottom end and the opposing side ends, forming an interior cavity for retaining landscaping materials. The front surface and the rear surface are secured together via stitching, gluing, adhesives, staples, etc., or any other suitable securing means as is known in the art.

In one embodiment, once the landscaping materials are inserted into the interior cavity of the body component, the top end of the body component is then secured together via stitching, gluing, adhesives, staples, etc., or any other suitable securing means as is known in the art. In one embodiment, the top end of the body component comprises an easy open, tear off seam.

In one embodiment, the landscaping materials within the body component can be mulch, seeds, rocks, wood chips, stones, etc., or any other suitable landscaping material as is known in the art.

In one embodiment, the body component is manufactured of a fabric material, such as woven fabrics which are often made with polypropylene and linen fabrics for durability, nonwoven fabrics, such as polyester, spun fabrics which are made from swirling polyester fibers to create an open weave, and burlap, etc., or any other suitable fabric materials as is known in the art. Typically, woven fabrics are used because such fabric allows water and air to pass through while keeping weeds from growing up into the garden bed. This type of fabric is recommended for high traffic areas since the added reinforcement allows it to be walked on without tearing or wearing thin. Nonwoven fabrics tend not to last as long as woven fabrics and are recommended for mulch beds that receive low traffic. The nonwoven fabrics also have less permeability, meaning less air and water passing through for plants. Spun fabrics are ideal for mulch beds, as it will block out weeds while still allowing water and air to pass through. The open weave of spun fabrics makes it stronger and more durable than most. In addition, this landscaping fabric effectively keeps large tree roots from breaching the fabric layer while water and air still permeate. Burlap fabrics are organic as opposed to synthetic materials. They offer a high-quality fabric that will stand the test of time. They can help protect plants and flower beds from harsh weather and wildlife. However, organic landscaping fabric is not as durable as synthetic materials.

In one embodiment, the body component comprises a plurality of cut guides which are positioned on the exterior of the front and rear surfaces of the body component. The cut guides delineate where a user should cut when using the body component as landscaping fabric. Thus, the cut guides are markings which indicate directions for cutting the body component open for use. The cut guides can vary in location along the body component, depending on the size and shape of the body component.

In one embodiment, once the body component is emptied of landscaping materials, the user utilizes the cut guides to cut open the body component to use as landscaping fabric. Once cut and spread open the body component is laid out on the flowerbeds as landscaping fabric, then covered with mulch, rocks, wood chips, etc., or any other landscaping materials. Typically, landscaping fabric is used to cover the ground to prevent weeds from growing and keeps a user's garden and flowerbeds weed free. The landscaping fabric is placed over the soil before any plants or mulch are added. The landscaping fabric allows water and air to pass through while preventing the growth of weeds.

In one embodiment, the body component comprises an easy to open fastening means located on the outer edges of the body component, which releasably secures the bottom edges, top edges, and side edges together. In one embodiment, the easy to open fastening means is a single thread chain stitch, that opens easily along its seams when pulled or can be easily cut open to spread open the body component to create a single flat sheet. The easy to open fastening means secures the top surface and the rear surface together at the bottom edges, top edges, and side edges to form an interior cavity. The interior cavity is sized and shaped to retain an appropriate amount of landscaping materials. In the unopened position, the body component functions as a landscaping bag for retaining landscaping materials. Once emptied, the body component is cut and spread open. Thus, in the open position, the body component functions as a landscaping fabric for preventing weeds. Accordingly, the body component is utilized to transport mulch, then opened and spread out to be used as landscaping fabric, thus making the fabric lawn bag device environmentally friendly and cost effective.

In one embodiment, the fabric lawn bag device can be positioned in the flowerbed or other suitable position, still filled with mulch or other landscaping materials. Then, the easy to open fastening means located on the outer edges of the body component is quickly removed and the body component is spread open for use. The mulch can then be evenly spread over the body component. Thus, it is extremely easy to lay mulch and landscaping fabric, as the mulch is already on the landscaping fabric when the body component is opened and spread apart. Further, some landscaping fabric is biodegradable, so the body component may degrade over time. Once the body component is cut open and its contents (i.e., mulch) are spread evenly over the interior surface of the spread open body component, the fabric lawn bag device provides a vegetation barrier that also conserves moisture, as well as is aesthetically pleasing.

In yet another embodiment, the fabric lawn bag device comprises a plurality of indicia.

In yet another embodiment, a method of utilizing a fabric landscaping bag as landscaping fabric to save money and reduce environmental waste is disclosed. The method includes the steps of providing a fabric lawn bag device comprising a body component with a front surface and a rear surface secured together to form an interior cavity. The method also comprises inserting landscaping materials into the interior cavity, such as mulch, rocks, seed, etc. Further, the method comprises transporting the filled fabric lawn bag devices to a user's home. The method also comprises emptying the filled fabric lawn bag devices. Further, the method comprises cutting apart the fabric lawn bag devices to be used as landscaping fabric. Finally, the method comprises positioning the cut apart fabric lawn bag devices in a flower bed to be used as landscaping fabric.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
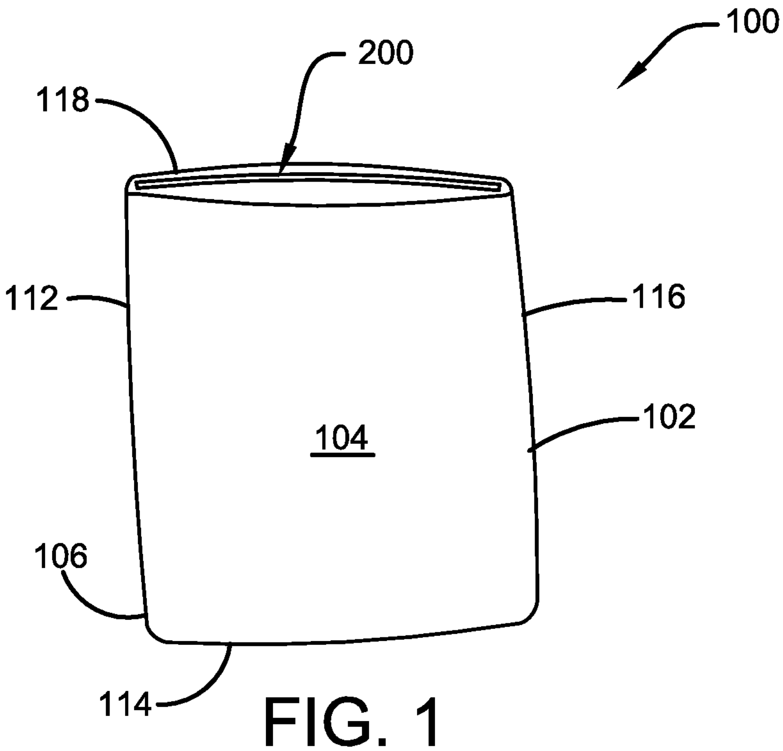
FIG. 1 illustrates a perspective view of one embodiment of the fabric lawn bag device of the present invention showing the bag device unopened in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a fabric lawn bag device that provides users with a fabric landscaping bag designed to hold mulch, seeds, rocks, and other materials. There is also a long-felt need in the art for a fabric lawn bag device that doubles as landscaping fabric once the bag is empty to save money and prevent the bags from being thrown away. Further, there is a long-felt need in the art for a fabric lawn bag device that allows users to purchase items in the bags and carry them from home to the store without worry of rips and tears via a strong, durable material. Moreover, there is a long-felt need in the art for a device that saves time and effort when spreading out weed-block underneath mulch, rocks, wood chips, and the like. Further, there is a long-felt need in the art for a fabric lawn bag device that provides a durable bag that won't tear when transporting heavy materials. Finally, there is a long-felt need in the art for a fabric lawn bag device that helps save money and reduce environmental waste.

The present invention, in one exemplary embodiment, is a novel fabric lawn bag device. The device is a landscaping fabric bag that can be used to hold rocks, mulch, wood chips, etc. The fabric lawn bag device comprises a body component that is configured in a rectangular shape that has a front surface and a rear surface secured together at a bottom end and the opposing side ends, forming an interior cavity for retaining landscaping materials. The body component is manufactured of a fabric material, such that the device is durable and will not tear easily even with heavy material inside. Once, users have emptied the bag device, the user cuts open the body component to lay flat and uses the body component as landscaping fabric to cover a flowerbed or other area. Accordingly, the fabric lawn bag device saves both money and reduces environmental waste by providing a device that functions as two individual products. The present invention also includes a novel method of utilizing a fabric landscaping bag as landscaping fabric to save money and reduce environmental waste. The method includes the steps of providing a fabric lawn bag device comprising a body component with a front surface and a rear surface secured together to form an interior cavity. The method also comprises inserting landscaping materials into the interior cavity, such as mulch, rocks, seed, etc. Further, the method comprises transporting the filled fabric lawn bag devices to a user's home. The method also comprises emptying the filled fabric lawn bag devices. Further, the method comprises cutting apart the fabric lawn bag devices to be used as landscaping fabric. Finally, the method comprises positioning the cut apart fabric lawn bag devices in a flower bed to be used as landscaping fabric.

Referring initially to the drawings, FIG. 1 illustrates a perspective view of one embodiment of the fabric lawn bag device 100 of the present invention. In the present embodiment, the fabric lawn bag device 100 is an improved fabric lawn bag device 100 that provides a user with a fabric landscaping bag that doubles as landscaping fabric once empty. Specifically, the fabric lawn bag device 100 comprises a body component 102 with a front surface 104 and a rear surface 106 secured together to form an interior cavity 108 for holding landscaping material 110. The body component 102 is manufactured of a fabric material 112, such that the device 100 is durable and will not tear easily even with heavy material inside. Once, users have emptied the bag device 100, the user cuts open the body component 102 to lay flat and uses the body component 102 as landscaping fabric to cover a flowerbed or other area. Thus, users can use the body component 102 as landscaping fabric via placing the landscape material 110 on top of the body component 102, instead of buying landscaping fabric and throwing away plastic bags. Accordingly, the fabric lawn bag device 100 saves both money and reduces environmental waste by providing a device 100 that functions as two individual products.

Generally, the fabric lawn bag device 100 comprises a body component 102 that is configured in a rectangular shape but could be any suitable shape as is known in the art. The body component 102 is also available in different sizes and configurations depending on the needs and/or wants of a user. Further, the body component 102 comprises a front surface 104 and a rear surface 106 secured together at a bottom end 114 and the opposing side ends 116, forming an interior cavity 108 for retaining landscaping materials 110. The front surface 104 and the rear surface 106 are secured together via stitching, gluing, adhesives, staples, etc., or any other suitable securing means as is known in the art.

Figure 2:
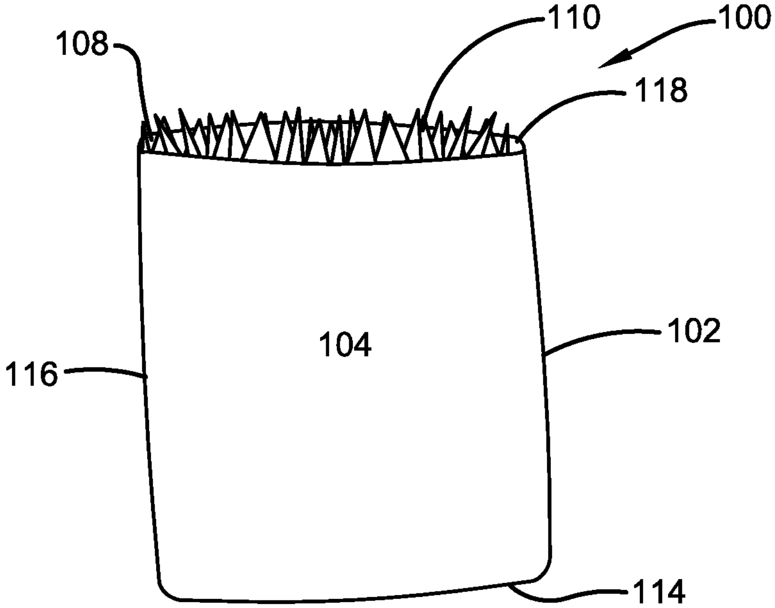
FIG. 2 illustrates a perspective view of one embodiment of the fabric lawn bag device of the present invention showing the bag device with mulch inside in accordance with the disclosed architecture.

As shown in FIG. 2, the landscaping materials 110 within the body component 102 can be mulch, seeds, rocks, wood chips, stones, etc., or any other suitable landscaping material 110 as is known in the art.

Further, once the landscaping materials 110 are inserted into the interior cavity 108 of the body component 102, the top end 118 of the body component 102 is then secured together via stitching, gluing, adhesives, staples, etc., or any other suitable securing means as is known in the art. In one embodiment, the top end 118 of the body component 102 comprises an easy open, tear off scam 200.

Generally, the body component 102 is manufactured of a fabric material 112, such as woven fabrics which are often made with polypropylene and linen fabrics for durability, nonwoven fabrics, such as polyester, spun fabrics which are made from swirling polyester fibers to create an open weave, and burlap, etc., or any other suitable fabric materials as is known in the art. Typically, woven fabrics are used because such fabric allows water and air to pass through while keeping weeds from growing up into the garden bed. This type of fabric is recommended for high traffic areas since the added reinforcement allows it to be walked on without tearing or wearing thin. Nonwoven fabrics tend not to last as long as woven fabrics and are recommended for mulch beds that receive low traffic. The nonwoven fabrics also have less permeability, meaning less air and water passing through for plants. Spun fabrics are ideal for mulch beds, as it will block out weeds while still allowing water and air to pass through. The open weave of spun fabrics makes it stronger and more durable than most. In addition, this landscaping fabric effectively keeps large tree roots from breaching the fabric layer while water and air still permeate. Burlap fabrics are organic as opposed to synthetic materials. They offer a high-quality fabric that will stand the test of time. They can help protect plants and flower beds from harsh weather and wildlife. However, organic landscaping fabric is not as durable as synthetic materials.

Figure 3:
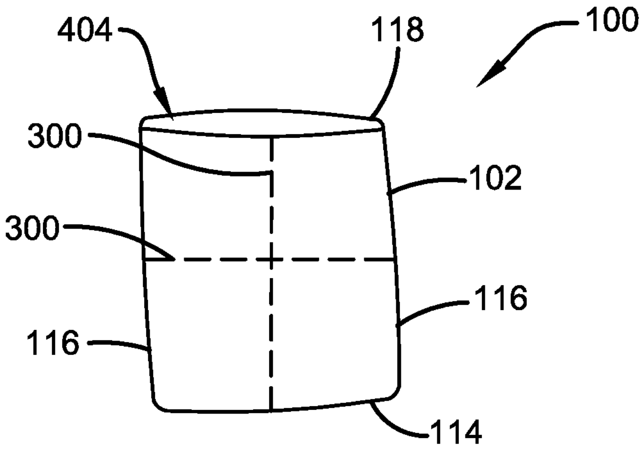
FIG. 3 illustrates a perspective view of one embodiment of the fabric lawn bag device of the present invention showing the bag device with cut guides in accordance with the disclosed architecture.

As shown in FIG. 3, the body component 102 comprises a plurality of cut guides 300 which are positioned on the exterior 302 of the front 104 and rear 106 surfaces of the body component 102. The cut guides 300 delineate where a user should cut when using the body component 102 as landscaping fabric. Thus, the cut guides 300 are markings which indicate directions for cutting the body component 102 open for use. The cut guides 300 can vary in location along the body component 102, depending on the size and shape of the body component 102.

Once the body component 102 is emptied of landscaping materials 110, the user utilizes the cut guides 300 to cut open the body component 102 to use as landscaping fabric. Once cut and spread open the body component 102 is laid out on the flowerbeds as landscaping fabric, then covered with mulch, rocks, wood chips, etc., or any other landscaping materials 110. Typically, landscaping fabric is used to cover the ground to prevent weeds from growing and keeps a user's garden and flowerbeds weed free. The landscaping fabric is placed over the soil before any plants or mulch are added. The landscaping fabric allows water and air to pass through while preventing the growth of weeds.

Figure 4:
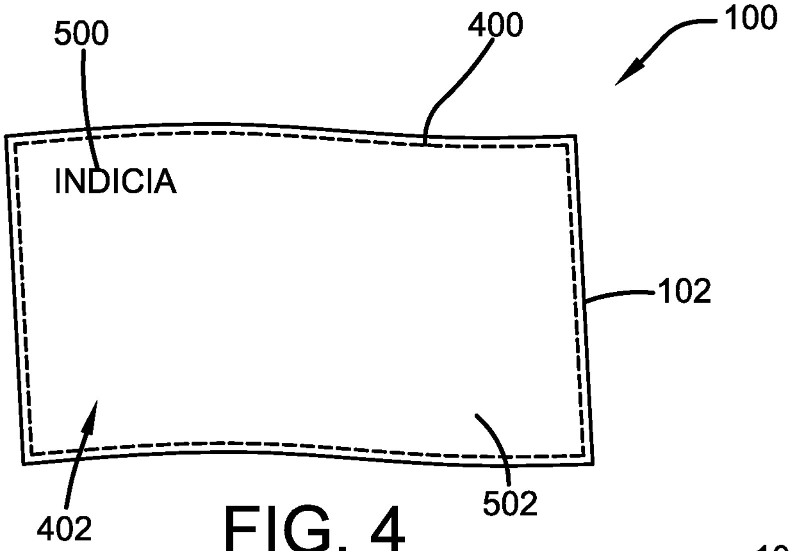
FIG. 4 illustrates a perspective view of one embodiment of the fabric lawn bag device of the present invention showing the bag device spread open in accordance with the disclosed architecture.

As shown in FIG. 4, the body component 102 comprises an easy to open fastening means located on the outer edges 114, 116, 118 of the body component 102, which releasably secures the bottom edges 114, top edges 118, and side edges 116 together. In one embodiment, the easy to open fastening means is a single thread chain stitch 400, that opens easily along its seams when pulled or can be easily cut open to spread open the body component 102 to create a single flat sheet 402. The easy to open fastening means 400 secures the front surface 104 and the rear surface 106 together at the bottom edges 114, top edges 118, and side edges 116 to form an interior cavity 108. The interior cavity 108 is sized and shaped to retain an appropriate amount of landscaping materials 110. In the unopened position, the body component 102 functions as a landscaping bag 404 for retaining landscaping materials 110. Once emptied, the body component 102 is cut and spread open. Thus, in the open position, the body component 102 functions as a landscaping fabric (i.e., flat sheet 402) for preventing weeds. Accordingly, the body component 102 is utilized to transport mulch, then opened and spread out to be used as landscaping fabric 402, thus making the fabric lawn bag device 100 environmentally friendly and cost effective.

Figure 5:
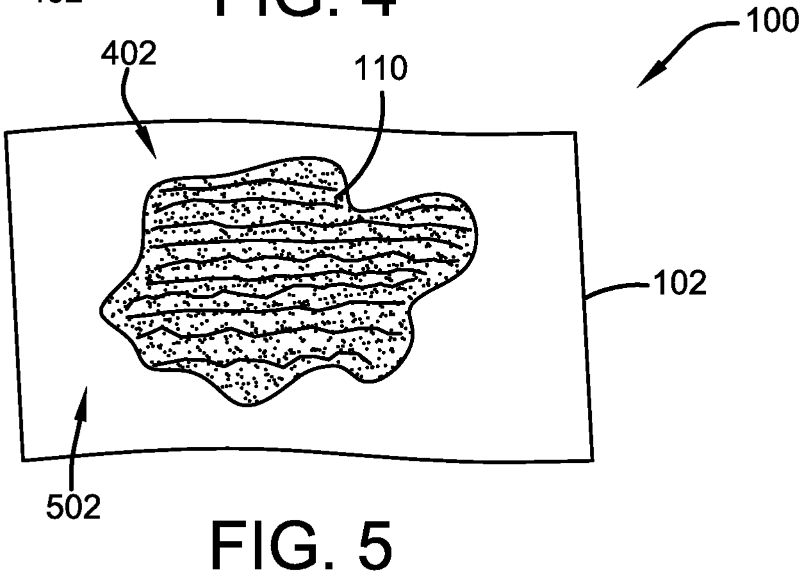
FIG. 5 illustrates a perspective view of one embodiment of the fabric lawn bag device of the present invention with the bag device spread open and mulch on top in accordance with the disclosed architecture.

As shown in FIG. 5, in one embodiment, the fabric lawn bag device 100 can be positioned in the flowerbed or other suitable position, still filled with mulch or other landscaping materials 110. Then, the easy to open fastening means 400 located on the outer edges 114, 116, 118 of the body component 102 is quickly removed and the body component 102 is spread open for use. The mulch 110 can then be evenly spread over the body component 102. Thus, it is extremely easy to lay mulch 110 and landscaping fabric 402, as the mulch 110 is already on the landscaping fabric 402 when the body component 102 is opened and spread apart. Further, some landscaping fabric 402 is biodegradable, so the body component 102 may degrade over time. Once the body component 102 is cut open and its contents (i.e., mulch 110) are spread evenly over the interior surface 502 of the spread open body component 102, the fabric lawn bag device 100 provides a vegetation barrier that also conserves moisture, as well as is aesthetically pleasing.

In yet another embodiment, the fabric lawn bag device 100 comprises a plurality of indicia 500. The body component 102 of the device 100 may include advertising, a trademark, or other letters, designs, or characters, printed, painted, stamped, or integrated into the body component 102, or any other indicia 500 as is known in the art. Specifically, any suitable indicia 500 as is known in the art can be included, such as, but not limited to, patterns, logos, emblems, images, symbols, designs, letters, words, characters, animals, advertisements, brands, etc., that may or may not be landscaping material, landscaping fabric, or brand related.

Figure 6:
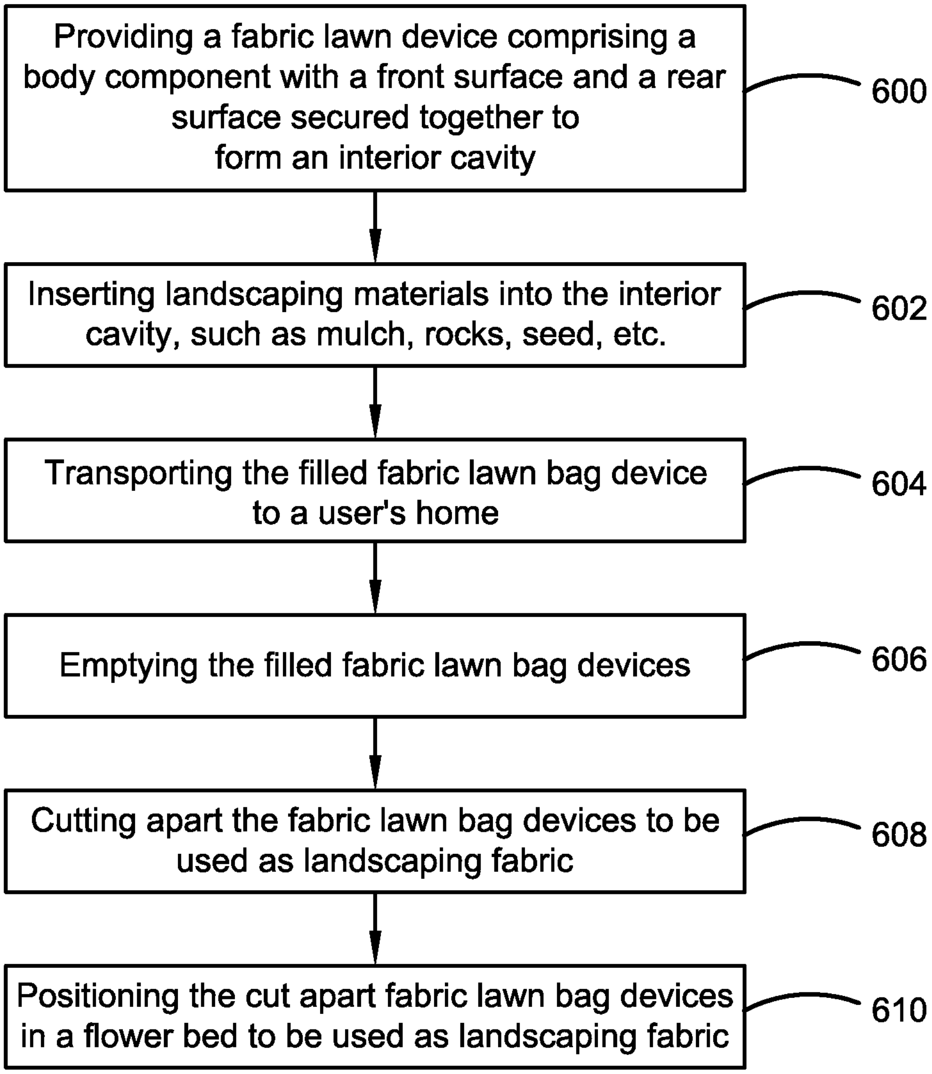
FIG. 6 illustrates a flowchart showing the method of utilizing a fabric landscaping bag as landscaping fabric to save money and reduce environmental waste in accordance with the disclosed architecture.

FIG. 6 illustrates a flowchart of the method of utilizing a fabric landscaping bag as landscaping fabric to save money and reduce environmental waste. The method includes the steps of at 600, providing a fabric lawn bag device comprising a body component with a front surface and a rear surface secured together to form an interior cavity. The method also comprises at 602, inserting landscaping materials into the interior cavity, such as mulch, rocks, seed, etc. Further, the method comprises at 604, transporting the filled fabric lawn bag devices to a user's home. The method also comprises at 606, emptying the filled fabric lawn bag devices. Further, the method comprises at 608, cutting apart the fabric lawn bag devices to be used as landscaping fabric. Finally, the method comprises at 610, positioning the cut apart fabric lawn bag devices in a flower bed to be used as landscaping fabric.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "fabric lawn bag device", "bag device", "fabric bag device", and "device" are interchangeable and refer to the fabric lawn bag device 100 of the present invention.

Notwithstanding the foregoing, the fabric lawn bag device 100 of the present invention can be of any suitable size and configuration as is known in the art without affecting the overall concept of the invention, provided that it accomplishes the above-stated objectives. One of ordinary skill in the art will appreciate that the fabric lawn bag device 100 as shown in FIGS. 1-6 is for illustrative purposes only, and that many other sizes and shapes of the fabric lawn bag device 100 are well within the scope of the present disclosure. Although the dimensions of the fabric lawn bag device 100 are important design parameters for user convenience, the fabric lawn bag device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A fabric lawn bag device that provides a user with a fabric landscaping bag that doubles as landscaping fabric once empty, the fabric lawn bag device comprising:

a body component manufactured from a fabric material; and landscaping material;

wherein the body component comprises a front surface and a rear surface secured together at a bottom end to form an interior cavity;

wherein the landscaping material is inserted into the interior cavity to be retained therein;

wherein once the body component is emptied, a user can cut open and spread out the body component to be used as a landscaping fabric to prevent growth of weeds;

wherein a top end of the body component comprises an easy open, tear off seam;

wherein the body component further comprises a plurality of cut guides positioned on an exterior of the front and rear surfaces of the body component which indicate directions for cutting the body component open for use as landscaping fabric; and further wherein the body component comprises an easy to open fastening means located on the top end, the bottom end, and opposing side ends of the body component, which releasably secures the front surface and the rear surface together.

2. The fabric lawn bag device of claim 1, wherein the body component is configured in a rectangular shape.

3. The fabric lawn bag device of claim 2, wherein the front surface and the rear surface are secured together at a bottom end and at opposing side ends, forming the interior cavity for retaining the landscaping material.

4. The fabric lawn bag device of claim 3, wherein the landscaping material within the body component is mulch, seeds, rocks, wood chips, or stones.

5. The fabric lawn bag device of claim 4, wherein the fabric material comprises woven fabrics, nonwoven fabrics, spun fabrics, or burlap.

6. The fabric lawn bag device of claim 5, wherein in an unopened position, the body component functions as a landscaping bag for retaining landscaping material.

7. A fabric lawn bag device that provides a user with a fabric landscaping bag that doubles as landscaping fabric once empty, the fabric lawn bag device comprising:

a body component configured in a rectangular shape; and landscaping material;

wherein the body component comprises a front surface and a rear surface at a bottom end and at opposing side ends, forming an interior cavity for retaining the landscaping material;

wherein the landscaping material within the body component is mulch, seeds, rocks, wood chips, or stones;

wherein a top end of the body component comprises an easy open, tear off seam;

wherein the body component is manufactured of a fabric material comprising woven fabrics, nonwoven fabrics, spun fabrics, or burlap;

wherein the body component comprises a plurality of cut guides which are positioned on an exterior of the front and rear surfaces of the body component;

wherein the plurality of cut guides are markings which indicate directions for cutting the body component open for use as landscaping fabric; and wherein the body component further comprises an easy to open fastening means located on the top end, the bottom end, and side ends of the body component, which releasably secures the front surface and the rear surface together.

8. The fabric lawn bag device of claim 7, wherein the easy to open fastening means is a single thread chain stitch, that opens easily along its seams when pulled or can be easily cut open to spread open the body component to create a single flat sheet.

9. The fabric lawn bag device of claim 7 further comprising a plurality of indicia.

10. The fabric lawn bag device of claim 7 wherein in an unopened position, the body component functions as a landscaping bag for retaining landscaping material; and in an opened position, the body component functions as a landscaping fabric for preventing weeds.

11. A method of utilizing a fabric landscaping bag as landscaping fabric to save money and reduce environmental waste, the method comprising the following steps:

providing a fabric lawn bag device comprising a body component with a front surface and a rear surface releasably secured together via an easy opening fastening means on a top end, a bottom end, and opposing side ends of the body component to form an interior cavity;

inserting landscaping materials into the interior cavity comprising mulch, rocks, seed, etc.;

transporting the filled fabric lawn bag devices to a user's home;

emptying the filled fabric lawn bag devices;

cutting apart the fabric lawn bag devices to be used as landscaping fabric; and positioning the cut apart fabric lawn bag devices in a flower bed to be used as landscaping fabric; and wherein the top end of the body component comprises an easy open, tear off seam;

wherein the body component further comprises a plurality of exteriorly positioned front and rear surface cut guides indicating directions for cutting the body component open.

* * * * *